(12) United States Patent
Virgili-Llop et al.

(10) Patent No.: US 10,297,168 B1
(45) Date of Patent: May 21, 2019

(54) DYNAMICALLY TILTING FLAT TABLE TO IMPART A TIME-VARYING GRAVITY-INDUCED ACCELERATION ON A FLOATING SPACECRAFT SIMULATOR

(71) Applicant: The United States of America, as represented by the Secretary of the Navy, Washington, DC (US)

(72) Inventors: Josep Virgili-Llop, Monterey, CA (US); Richard Salvatore Zappulla, II, Kirtland, NM (US); Marcello Romano, Monterey, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 104 days.

(21) Appl. No.: 15/593,931

(22) Filed: May 12, 2017

Related U.S. Application Data

(60) Provisional application No. 62/455,775, filed on Feb. 7, 2017.

(51) Int. Cl.
   *G06F 11/30* (2006.01)
   *G09B 9/52* (2006.01)
   (Continued)

(52) U.S. Cl.
   CPC ............ *G09B 9/52* (2013.01); *F16C 32/0603* (2013.01); *G01C 9/00* (2013.01)

(58) Field of Classification Search
   CPC ...................................................... G09B 9/52
   See application file for complete search history.

(56) References Cited

U.S. PATENT DOCUMENTS

| | | | |
|---|---|---|---|
| 7,490,572 B2 * | 2/2009 | Groben | B60R 11/04 114/191 |
| 8,931,741 B1 * | 1/2015 | Kilchichakov | G09B 9/52 244/159.4 |

(Continued)

OTHER PUBLICATIONS

Schwartz et al., "Historical review of air-bearing spacecraft simulators," Journal of Guidance, Control, and Dynamics 26 (4) (2003).

(Continued)

*Primary Examiner* — Phuong Huynh
(74) *Attorney, Agent, or Firm* — Naval Postgraduate School; James B. Potts; Lisa A. Norris

(57) ABSTRACT

Disclosed is a planar test bed comprising a planar surface and further comprising mechanical couplings in mechanical communication with the planar table and the supporting legs. The mechanical couplings are translatable to provide three degrees of freedom for orientation of the planar surface. A processor receives position and velocity information describing an object on the planar surface, and calculates a relative acceleration typically using a function $a_R=f(t,x_R,v_R,\mu_r)$. The processor communicates with the mechanical couplings to establish an orientation where a local gravity vector projects onto the planar surface and generates acceleration with magnitude and direction substantially equal to the desired acceleration $a_R$. The operations occur in cyclic fashion so the desired accelerations and planar orientations are updated as an object transits over the planar surface.

15 Claims, 7 Drawing Sheets

(51) Int. Cl.
    G01C 9/00    (2006.01)
    F16C 32/06    (2006.01)

(56) References Cited

U.S. PATENT DOCUMENTS 8,983,634 B2  3/2015  Yank
2009/0299689 A1* 12/2009 Stubben .................. A47B 91/16
                                                    702/154

OTHER PUBLICATIONS

Rybus et al., "Planar air-bearing microgravity simulators: Review of applications, existing solutions and design parameters," Acta Astronautica 120 (2016).
Wilde et al., "Experimental Characterization of Inverse Dynamics Guidance and Control in Docking with a Rotating Target," Journal of Guidance, Control, and Dynamics 39(6) (2016).
Ciarciá et al., "Near-optimal guidance for cooperative docking maneuvers," Acta Astronautica 102 (2014).
Curti et al., "Lyapunov-based Thrusters' Selection for Spacecraft Rotational and Translational Control: Analysis: Simulations and Experiments," Journal of Guidance, Control, and Dynamics 33(4) (2010).
Romano et al., "Laboratory Experimentation of Autonomous Spacecraft Approach and Docking to a Collaborative Target," Journal of Spacecraft and Rockets 44(1) (2007).
Menon et al., "Issues and solutions for testing free-flying robots," Acta Astronautica 60 (12) (2007).
Xu et al., "Survey of modeling, planning, and ground verification of space robotic systems," Acta Astronautica 68 (11-12) (2011).
Ciarciá et al., "Experimental Emulation of the Scaled Clohessy-Wiltshire Dynamics on a Flat Air-bearing Testbed," AIAA SciTech Forum, Guidance, Navigation, and Control Conference, Jan. 9-13, 2017, Grapevine, Texas.
Mikkola et al., "Quasi-satellite dynamics in formation flight,"Mon Not R Astron Soc 457(2) (2016).
Rybus et al., "New planar air-bearing microgravity simulator for verification of space robotics numerical simulations and control algorithms," Proceedings of 12th Symposium on Advanced Space Technologies in Robotics and Automation (2013).
Jiang et al., "Study on Relative Orbit Geometry of Spacecraft Formations in Elliptical Reference Orbits," Journal of Guidance, Control, and Dynamics 31(1) (2008).
Wilson et al., "A Multimodule Planar Air Bearing Testbed for CubeSat-Scale Spacecraft," Journal of Dynamic Systems, Measurement, and Control 135 (2013).
Chen et al.,"A Common Ground Experiment Testbed for Synthetic Mission Demonstration of Small Satellites," Proceedings of the AIAA/USU Conference on Small Satellites, Mission Lessons (2009).
Zappulla et al., "Floating Spacecraft Simulator Test Bed for the Experimental Testing of Autonomous Guidance, Navigation, and Control of Spacecraft Proximity Maneuvers and Operations," AIAA 2016-5268, AIAA Space Forum, AIAA/AAS Astrodynamics Specialist Conference, Sep. 13-16, 2016, Long Beach, California.
Zappulla et al.,"Experiments on Autonomous Spacecraft Rendezvous and Docking using an Adaptive Artificial Potential Field Approach," AAS 16-459, 26th AAS/AIAA Space Flight Mechanics meeting, Napa, California, Feb. 14-18, 2016, available at http://calhoun.nps.edu/handle/10945/50864 last accessed May 22, 2017.
Virigili-Llop et al., "Experimental Evaluation of Model Predictive Control and Inverse Dynamics Control for Spacecraft Proximity and Docking Maneuvers," 6th International Conference on Astrodynamics Tools and Techniques (ICATT), Darmstadt, Germany, Mar. 14-17, 2016, available at http://calhoun.nps.edu/handle/10945/50868 last accessed May 22, 2017.
Park et al., "Analysis and Experimentation of Model Predictive Control for Spacecraft Rendezvous and Proximity Operations with Multiple Obstacle Avoidance," AIAA 2016-5273, AIAA Space Forum, AIAA/AAS Astrodynamics Specialist Conference, Sep. 13-16, 2016, Long Beach, California.
Virigili-Llop et al.,"Autonomous Capture of a Resident Space Object by a Spacecraft with a Robotic Manipulator: Analysis, Simulation and Experiments," AIAA 2016-5269, AIAA Space Forum, AIAA/AAS Astrodynamics Specialist Conference, Sep. 13-16, 2016, Long Beach, California.

* cited by examiner

DYNAMICALLY TILTING FLAT TABLE TO IMPART A TIME-VARYING GRAVITY-INDUCED ACCELERATION ON A FLOATING SPACECRAFT SIMULATOR

RELATION TO OTHER APPLICATIONS

This patent application claims the benefit of U.S. Provisional Application No. 62/445,775 filed Feb. 7, 2017, which is hereby incorporated in its entirety.

FIELD OF THE INVENTION

One or more embodiments relates generally to a planar test bed with a programmed controller specifying time-variant orientations of a planar surface on the test bed via communication with adjustable mounts. The planar surface of the test bed may be utilized for the simulation of spacecraft using test vehicles supported on air-bearings and transiting on the planar surface.

BACKGROUND

Floating spacecraft simulators (also known as planar air bearing test beds) are extensively utilized to conduct spacecraft dynamic model and guidance and control systems development, validation, and verification in a dynamically representative environment. In a floating spacecraft simulator, one or more robotic test vehicles, each of them representing a spacecraft, operate on top of a smooth, flat, and horizontally leveled surface. Planar air bearings are used to create a low friction loadbearing interface between the test vehicle and the flat surface. Given the smoothness and horizontality of the flat surface, the test vehicles experience a quasi-frictionless and weightless motion in two dimensions. This dynamic environment recreates the drag-free and weightless motion experienced by orbiting spacecraft (commonly referred to as reduced gravity or microgravity) on a plane.

The planar air bearings, which can be mounted either on the test vehicles or on the flat surface, use pressurized air to establish a thin film of air between themselves and their opposing surface. The air film acts as a lubricant and supports the weight of the test vehicle. The reduced gravity level attained on the test bed depends on the air bearings performance as well as on the flatness, smoothness, and horizontality of the operating surface. Epoxy-coated floors, glass panes, and granite tables are commonly used as operating surfaces. Granite tables are usually the preferred option as they can be accurately leveled and machined to a high planarity and smoothness level, while offering excellent stiffness and thermal stability.

Surveys on the technology and applications of air-bearing test beds are available. See e.g., Schwartz et al., "Historical review of air-bearing spacecraft simulators," *Journal of Guidance, Control, and Dynamics* 26 (4) (2003); see also Rybus et al., "Planar air-bearing microgravity simulators: Review of applications, existing solutions and design parameters," *Acta Astronautica* 120 (2016). See also, Wilde et al., "Experimental Characterization of Inverse Dynamics Guidance and Control in Docking with a Rotating Target," *Journal of Guidance, Control, and Dynamics* 39(6) (2016); see also Ciarcia et al., "Near-optimal guidance for cooperative docking maneuvers," *Acta Astronautica* 102 (2014); see also Curti et al., "Lyapunov-based Thrusters' Selection for Spacecraft Rotational and Translational Control: Analysis: Simulations and Experiments," *Journal of Guidance, Control, and Dynamics* 33(4) (2010); see also Romano et al., "Laboratory Experimentation of Autonomous Spacecraft Approach and Docking to a Collaborative Target," *Journal of Spacecraft and Rockets* 44(1) (2007). In addition to air-bearing facilities, neutral buoyancy, free-falling (either with parabolic flights or drop towers), and suspension apparatus for gravity compensation are also used in an attempt to recreate a reduced gravity environment. See e.g. Menon et al., "Issues and solutions for testing free-flying robots," *Acta Astronautica* 60 (12) (2007); and see Xu et al., "Survey of modeling, planning, and ground verification of space robotic systems," *Acta Astronautica* 68 (11-12) (2011).

Having ground-based facilities where the dynamics of orbiting spacecraft can be recreated is exceptionally valuable to develop, test, and validate spacecraft dynamic model and guidance and control systems. In particular, these testbeds are mainly used to recreate spacecraft docking and short duration close proximity maneuvers. Other potential applications, that would greatly expand the applicability of the test bed, include, for example, recreating spacecraft rendezvous, longer duration proximity maneuvers, and planetary landings. In these other applications, the dynamic environment to be recreated includes non-inertial, gravitational or other environmental accelerations that cannot be neglected. In principle, the test vehicle's actuators could be used to recreate these accelerations, but using the test vehicle's actuators interferes with the dynamic behavior of the test vehicle, reducing the dynamic fidelity of the test bed. See e.g. Ciarcia et al., "Emulating Scaled Clohessy-Wiltshire Dynamics on an Air-bearing Spacecraft Simulation Testbed," AIAA SciTech Forum, Guidance, Navigation, and Control Conference, 9-13 Jan. 2017, Grapevine, Tex.

By tilting the test bed operating surface away from its nominal horizontally leveled state a gravitational acceleration is imparted to the test vehicles. This gravitational acceleration, if carefully controlled, can be used to recreate non-inertial, gravitational or other environmental accelerations. For example, the recreation of the surface gravity of a planetary body (e.g., asteroid) may be obtained to experimentally evaluate spacecraft landing maneuvers. By statically tilting the operating surface, a constant acceleration in a particular direction will be imparted to the test vehicle, thus recreating the planetary body's surface gravity. When recreating the relative motion of the two orbiting spacecraft in close proximity the resulting non-inertial acceleration is time varying and depends on the relative state between the two vehicles, thus requiring a time-varying operating surface tilt. Other environmental accelerations (e.g., solar radiation pressure, aerodynamic drag, gravitational acceleration while orbiting an irregular central body) are also be time-varying and require a time-varying operating surface tilt.

In current air bearing test bed setups, the orientation of the operating surface with respect to the local horizontal may, in some instances, be manually adjustable. Tilting the operating surface is then a manual, discrete operation, and the acceleration provided by gravity acts with constant direction and magnitude regardless of changing spatial and kinematic conditions among the test vehicle or vehicles present.

It would be advantageous to provide a floating spacecraft simulator comprising a flat table that dynamically and automatically changes its orientation with respect to the local gravity to impart a desired time-varying acceleration to the test vehicles. This capability could be used to impart time-varying accelerations to the test vehicles without using their actuators, thus allowing to recreate, for example, rendezvous, proximity maneuvers, and planetary landings, greatly extending the applicability of planar air bearing test beds.

These and other objects, aspects, and advantages of the present disclosure will become better understood with reference to the accompanying description and claims.

SUMMARY

The planar test bed disclosed comprises a planar table comprising a planar surface and further comprising one or more mechanical couplings, with each mechanical coupling in mechanical communication with the planar table and a supporting leg. The mechanical couplings are slidably, rotatably, or otherwise translatable to provide three degrees of freedom to the planar table. A processor is in data communication with the mechanical couplings and issues commands to the mechanical couplings to alter the spatial orientation of the planar table in a transient process, in order to allow the projection of the local gravity vector g onto the operating surface plane to mimic an anticipated relative acceleration imparted to a test vehicle in a simulated environment.

The processor is programmed to provide commands to the mechanical couplings by executing a series of programmed steps in a generally cyclic fashion. At a given time, the processor receives, typically among other relevant parameters, an object location describing the location of an object on the planar surface, and also receives an object velocity. Using the position and velocity, the processor calculates a relative acceleration desired between the object and a fixed location on the planar table typically using a function $a_R = f(t, x_R, v_R, \mu_t)$, where $a_R$ denotes the relative acceleration vector, t the time, $x_R$ the relative position vector, $v_R$ the relative velocity vector and $\mu_t$ a set of time-varying parameters. Given the desired acceleration, the processor issues commands to the mechanical couplings and establishes the planar surface in an orientation whereby a vector projection of a local gravity vector onto the planar surface generates an acceleration parallel to the planar surface and having magnitude and direction substantially equal to the desired acceleration $a_R$. The planar test bed conducts this process in a cyclic manner so that desired accelerations and planar orientations are updated as an object transits over the planar surface. In a particular embodiment, the system further comprises a camera vision sensing system providing at least positional data to the processor during the cyclic process.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an apparatus and method for the generation of a time-varying gravity-induced acceleration on a test vehicle operating on top of the planar test bed surface.

Figure 1:
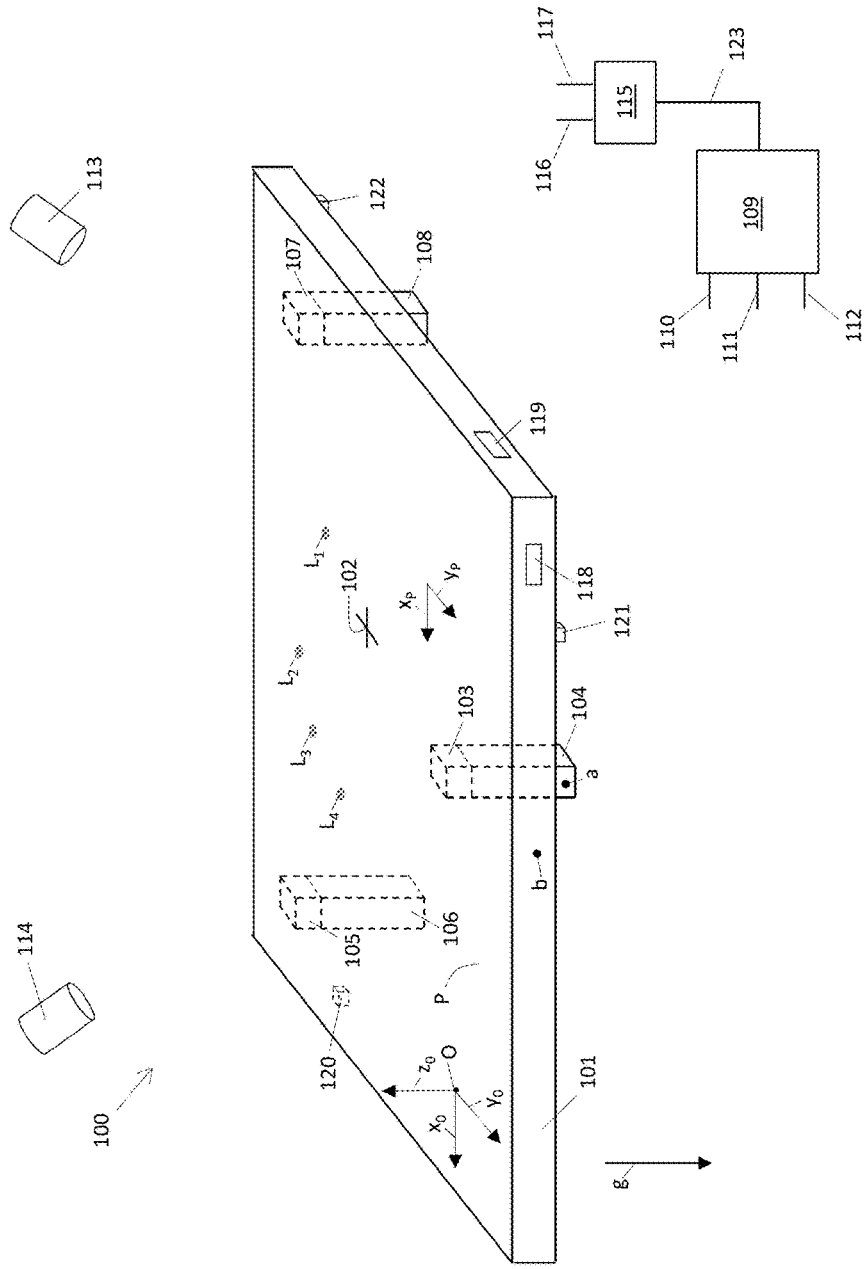
FIG. 1 illustrates a particular embodiment of a planar test bed.

A particular embodiment of the planar test bed is illustrated at FIG. 1 and indicated generally at 100. Planar test bed 100 comprises planar table 101, with planar table 101 comprising planar surface P. Planar surface P further comprises first location 102, where first location 102 is a fixed location within the boundary of planar surface P, and further comprises an axis $x_p$ and an axis $y_p$, with the axis $x_p$ perpendicular to the axis $y_p$. Planar test bed 100 additionally comprises at least one mechanical coupling such 103, 105, and 107 in mechanically communication with planar table 101 and supporting legs 104, 106, and 108 respectively. In operation, supporting legs 104, 106, and 108 are typically standing on a fixed floor. A processor 109 is in data communication with the mechanical couplings and issues commands to the mechanical couplings to alter the spatial orientation of planar table 101 in a transient process, in order to allow the projection of the local gravity vector g onto the operating surface plane to mimic an anticipated relative acceleration on the test vehicle in a simulated environment. For reference. FIG. 1 also illustrates a point on planar surface P comprising an origin O, with an axis $z_0$ parallel to a local gravity vector g, an axis $x_0$ perpendicular to the axis $z_0$, and an axis $y_0$ perpendicular to both $x_0$ and $z_0$.

Figure 2:
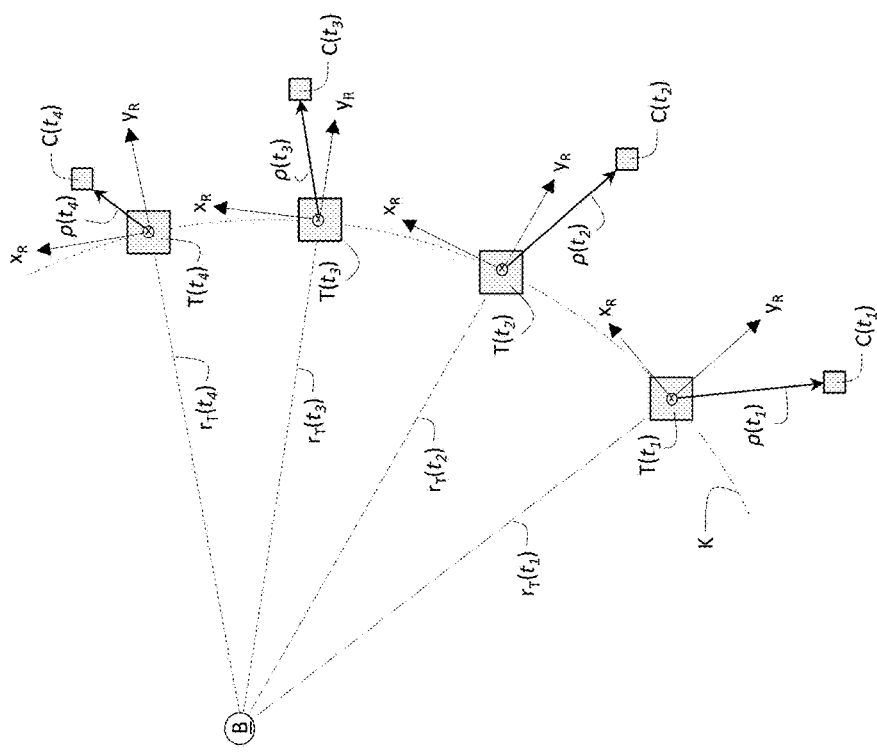
FIG. 2 illustrates a coordinate system and scenario for simulation on the planar test bed.

As discussed, test beds involving planar surfaces and intended to support test vehicles on air bearings have been used to simulate free-flying spacecraft environments. The air bearings allows quasi-frictionless translational and rotational freedom of the test vehicle over the planar surface, and often provide for supporting leg adjustment in order to level the planar surface with the local horizontal, achieving a reduced gravity environment on the plane. See e.g., Rybus, et al., "Planar air-bearing microgravity simulators: Review of applications, existing solutions and design parameters," *Acta Astronautica* 120 (2016), among others. However, these planar test beds are established in a given, fixed orientation so that the simulated acceleration on the planar surface is some constant value independent of test vehicle location. This presents significant limitation in systems where a relative acceleration imparted to the test vehicle is expected to vary based, for example, on the test vehicle position and velocity. For example, FIG. 2 illustrates time-based positions of a target spacecraft and a chaser spacecraft orbiting a body B and shown for times $t_1$, $t_2$, $t_3$, and $t_4$, with the position of the target spacecraft at the various times indicated as $T(t_1)$, $T(t_2)$, $T(t_3)$, and $T(t_4)$ respectively. The orbital path of the target spacecraft is indicated as K, and the respective radius vectors of the target from B at the respective times are illustrated as $r_T(t_1)$, $r_T(t_2)$, $r_T(t_3)$, and $r_T(t_4)$. Additionally indicated are the positions of a chaser spacecraft experiencing a different path around body B, with positions indicated as $C(t_1)$, $C(t_2)$, $C(t_3)$, and $C(t_4)$. A series of relative position vectors denoted $\rho(t)$, $\rho(t_2)$, $\rho(t_3)$, and $\rho(t_4)$ describe the location of the chaser spacecraft relative to the target spacecraft at the indicated times. At FIG. 2, the relative position vectors can be resolved onto a Cartesian Coordinate System which is local-vertical, local-horizontal (LVLH) and attached to the target spacecraft, where the coordinate system rotates with the target's radius vectors $r_T(t_1)$, $r_T(t_2)$, $r_T(t_3)$, and $r_T(t_4)$, and comprises an axis $y_R$ in the radial direction and an axis $x_R$ along the direction of the target's orbital velocity. A third axis $z_R$ (not shown), perpendicular to the orbital plane, may also be described to complete a right-handed orthogonal triad. The relative position vectors $\rho(t_1)$, $\rho(t_2)$, $\rho(t_3)$, and $\rho(t_4)$ describe the relative positions between the target and the chaser as stated, but additionally and as is understood, the time-varying nature of the relative position vectors provides relative velocity $\dot{\rho}(t)$ and relative acceleration $\ddot{\rho}(t)$ between the two bodies.

The relative acceleration $\ddot{\rho}(t)$ between the two bodies can be seen as the superposition of multiple accelerations caused by multiple physical phenomena. First, there is the acceleration between the two spacecraft arising from non-inertial nature of the reference frame and from the relative orbital dynamics $\ddot{\rho}_{rod}(t)$. The relative dynamics acceleration $\ddot{\rho}_{rod}(t)$ can be modelled, in the case of circular orbits and for small relative orbital distances, with the Hill-Clohessy-Wiltshire equations. In more general terms, the relative orbital dynamics acceleration between the two bodies might be expressed by some function $\ddot{\rho}_{rod}(t)=f(t,\rho,\dot{\rho},\mu_e)$, with $\mu_{rod}$ denoting the relevant orbital parameters, such as: mean motion, eccentricity, true anomaly, etc. In addition to the acceleration caused by the relative dynamics, the target or chaser spacecraft may be subject to a relative acceleration $\ddot{\rho}_e(t)$ caused by other environmental disturbances, such as: aerodynamic drag, solar radiation pressure, etc. This relative acceleration between the two bodies might also be expressed by some function $\ddot{\rho}_e(t)=f(t,\rho,\dot{\rho},\mu_e)$, with $\mu_e$ denoting the relevant environmental parameters (e.g., atmospheric density, orbital elements, spacecraft attitude, etc.). Finally, the action of the chaser or target actuators may also cause a relative acceleration $\ddot{\rho}_a(t)$. The resulting relative acceleration is then the combination of these $\ddot{\rho}(t)=\ddot{\rho}_{rod}(t)+\ddot{\rho}_e(t)+\ddot{\rho}_a(t)$. The relative acceleration $\ddot{\rho}_a(t)$ is recreated by the chaser and target actuators, while the relative acceleration due to the relative orbital dynamics $\ddot{\rho}_{rod}(t)$ or the environmental forces $\ddot{\rho}_e(t)$ is recreated by tilting the test bed operating surface $\ddot{\rho}_t(t)=\ddot{\rho}_{rod}(t)+\ddot{\rho}_e(t)$. This acceleration to be provided by the operating surface tilt might be expressed by some function $\ddot{\rho}_t(t)=f(t,\rho,\dot{\rho},\mu_t)$, with $\mu_t$ denoting the relevant orbital $\mu_{rod}$ and environmental parameters $\mu_e$.

Figure 3:
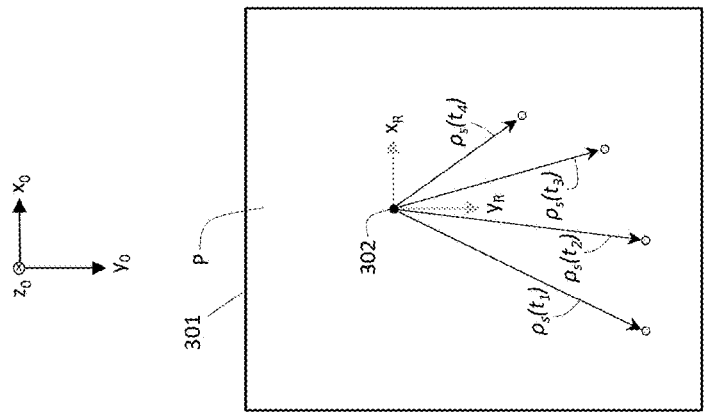
FIG. 3 illustrates an exemplary scenario on a planar surface.

As is additionally understood, the relative position vectors $\rho(t)$, $\rho(t_2)$, $\rho(t_3)$, and $\rho(t_4)$ between the target and the chaser can be represented on a planar test bed surface such as that illustrated at FIG. 3, with planar test bed 301 comprising planar surface P and further comprising first location 302, where first location 302 is a location on planar surface P. Here, the fixed location may be a static location on planar surface P, or may vary transiently in a manner known to a controller directing the orientation of the planar surface P. The various relative position vectors $\rho(t_1)$, $\rho(t_2)$, $\rho(t_3)$, and $\rho(t_4)$ expected from FIG. 2 are represented on planar surface P and relative to first location 302 as $\rho_S(t_1)$, $\rho_S(t_2)$, $\rho_S(t_3)$, and $\rho_S(t_4)$, with $x_R$ and $y_R$ illustrated for reference. An absolute orthogonal coordinate frame is additionally illustrated at FIG. 3 as $x_o$, $y_o$, and $z_o$, where $z_o$ is parallel to a local gravity vector and proceeding into the page. Adjusting the orientation of test bed 301 relative to $x_o$, $y_o$, and $z_o$ will provide a projection of the local gravity vector on planar surface P to simulate a given relative acceleration expected between a first body represented by first location 302 and a second body represented by positions described by $\rho_S(t_1)$, $\rho_S(t_2)$, $\rho_S(t_3)$, and $\rho_S(t_4)$. However, because the relative acceleration to be simulated by planar surface P is some function $\ddot{pt}(t)=f(t,\rho,\dot{\rho},\mu_t)$, without a substantially continuous means by which a necessary orientation may be determined and provided, the assumed orientation will have validity under only a single set of conditions. For example, an orientation of planar surface P assumed for the position described by $\rho_S(t_1)$ may provide a simulated relative acceleration appropriate for when a test vehicle assumes the $\rho_S(t_1)$ position and relative velocity, however the orientation becomes significantly less accurate as the test vehicle attempts to emulate the conditions at $\rho_S(t_2)$, $\rho_S(t_3)$, and $\rho_S(t_4)$.

The planar test bed disclosed herein greatly mitigates this issue by providing one or more mechanical couplings capable of establishing a planar surface orientation as directed by a controller in data communication with the mechanical couplings. In brief and as will be discussed further, the controller receives an object location describing a point on the planar surface from, for example, a camera vision sensing system monitoring the planar surface, a communication from a maneuvering test vehicle, or some other means, and additionally either receives or determines a velocity vector describing the state of the object. In operation, the "object" in terms of both location and velocity refers generally to some test vehicle operating on the planar surface during a simulation. The controller takes the object location and velocity and, based on the position and velocity relative to first location 302, determines a relative acceleration using a function of the form $\ddot{\rho}_t(t)=f(t,\rho,\dot{\rho},\mu_t)$ or equivalently $a_R=f(t,x_R,v_R,\mu_t)$. The controller then communicates with the mechanical couplings to establish an orientation of planar surface P such that the local gravity vector projected onto planar surface P mimics the relative acceleration vector $a_R$ determined for the situation as reported by the system. Generally $a_R$ comprises a first component parallel to the axis $x_p$ comprising planar surface P and a second component comprising the axis $y_p$ comprising planar surface P. In this manner, the processor cyclically operates such that the planar test bed provides time-varying relative accelerations on a test vehicle which appropriately vary as the test vehicle assumes various states during a simulation. For example, relative to FIG. 3, the controller and system might operate cyclically to determine positions and velocities as an object assumes the positions indicated as $\rho_S(t_1)$, $\rho_S(t_2)$, $\rho_S(t_3)$, and $\rho_S(t_4)$ over some time interval incorporating a $t_1$, $t_2$, $t_3$, and $t_4$, and provide planar surface orientation such that the local gravity projection accurately reflects the respective relative accelerations between those positions and first location 302 that would be expected as the relative spatial orientation on the planar surface P evolves.

As discussed, the particular embodiment of the planar test bed 100 illustrated at FIG. 1 comprises planar table 101, planar surface P, and first location 102 on planar surface P. First location 102 is a fixed location within the boundary of planar surface P, and planar surface P further comprises an axis $x_p$ and an axis $y_p$, with the axis $x_p$ perpendicular to the axis $y_p$. Planar surface P further provides a substantially flat surface. In an embodiment, the planar surface P comprises a contiguous area having a flatness deviation $\delta_e$ of less than 0.01 inches, and in certain embodiments, 0.001 inches. See e.g., ISO1101, *Geometrical product specifications (GPS)—Geometrical tolerancing—Tolerances of form, orientation, location and run-out* (2017). In some embodiments, planar surface P has a surface finish of 25 micron rms or better, and in other embodiments, planar surface P has a local flatness not exceeding 5 microns per 40 mm.

Planar test bed 100 further comprises one or more mechanical couplings such as mechanical couplings 103, 105, and 107, as earlier indicated. Each mechanical coupling is in mechanical communication with planar table 101 and further in mechanical communication with a supporting leg. For example, at FIG. 1 mechanical coupling 103 is in mechanical communication with both planar table 101 and supporting leg 104, mechanical coupling 105 is in mechanical communication with both planar table 101 and supporting leg 106, and mechanical coupling 107 is in mechanical communication with both planar table 101 and supporting leg 108. The mechanical couplings are generally slidably translatable, rotably translatable, or both, such that a mechanical translation of the mechanical coupling alters a position vector between some specific, fixed point comprising the planar table and some specific, fixed point comprising the supporting leg. For example, at FIG. 1, mechanical coupling 103 is mechanically translatable such that a mechanical translation of mechanical coupling 103 alters a position vector extending from point a on supporting leg 104 and point b on planar table 101. Such mechanically translatable couplings are known in the art. In a particular embodiment, the mechanical couplings comprise leveling wedges driven by a motorized element which allows communication from a controller to direct leveling wedge motion and subsequent mechanical translation of the coupling.

Planar test bed 100 further comprises processor 109 in data communication with the one or more mechanical couplings. "Data communication" as used here means that a connectivity sufficient to allow data to pass between a first component and a second component is present, regardless of whether any such data is presently passing from the first component to the second component. For example at FIG. 1, processor 109 is in data communication with mechanical couplings 103, 105, and 107 through channels 110, 111, and 112 via hard-wired, wireless, or some other means. As mentioned, processor 109 directs operations of the one or more mechanical couplings to adjust the orientation of planar table 101 and planar surface P such that a local gravity vector g generates an acceleration parallel to planar surface P in accordance with a computed function.

Processor 109 is programmed to provide commands to the mechanical couplings by executing a series of programmed steps in a generally cyclic fashion. As discussed, the commands generated orient planar surface P such that the gravity vector g acts through planar surface P in a manner representing a relative acceleration expected between two bodies in a simulated situation. Generally, processor 109 establishes the location of one body to the first location 102 of planar surface P while tracking the varying position of a second body over planar surface P, such that the observed motion of the second body with respect to the fixed first location 102 models the relative spatial parameters such as the relative position between the two bodies, the relative velocity between the two bodies, and the relative acceleration between the two bodies. For example at FIG. 1, the relative spatial parameters between a first object and a second object both orbiting a body such as earth might be represented on planar surface P with the first object anchored at first location 102, and the relative spatial displacement of the second object indicated by the time-varying object locations illustrated as $L_1$, $L_2$, $L_3$, and $L_4$. Generally at each object location $L_1$, $L_2$, $L_3$, and $L_4$, processor 109 issues commands to orient planar surface P such that the local gravity vector g generates an acceleration vector parallel to planar surface P that mimics the expected relative acceleration between the two bodies. As discussed, first location 102 may be a fixed point on planar surface P which remains statically located as depicted, or the position of first location 102 may vary with time in a manner provided to controller 109, so that for each of $L_1$, $L_2$, $L_3$, and $L_4$, processor 109 determines $v_R$ based on the transiently varying first location 102 and an $a_R$ based on the $x_R$, $v_R$, $\mu_r$. Additionally, it is understood that the designation of first location 102 as a first body co-orbiting with a second body in the foregoing is exemplary only, and that first location 102 could be representative of a first body having a wide variety of postures relative to the second body. For example, first location 102 could be representative of a first body orbited or approached by the second body, with $L_1$, $L_2$, $L_3$, and $L_4$ representing the relative spatial relationship during the orbit or approach. Other applicable situations may be envisioned.

In order to provide the necessary orientations of planar surface P, processor 109 is programmed to retrieve a quantified local gravity vector. The quantified local gravity vector provides a value for the local gravity expected such as g, and may be retrieved through any appropriate means, such as retrieval from an embedded memory device, receipt through a manual input, communication with an instrument such as an accelerometer, or other means. Processor 109 is further programmed to receive an object location at a time $t_0$, and programmed to treat the object location at the time $t_0$ as representative of a location on planar surface P, such as $L_1$. Processor 109 may retrieve the object location from any source. In a particular embodiment, processor 109 retrieves the object location via communication with a camera vision sensing system such as that comprising camera 113 and camera 114.

Processor 109 is further programmed to obtain an object velocity and treat the object velocity as a directional velocity of the object location received relative to first location 102. Processor 109 may obtain the object velocity from any source and any appropriate method. Typically processor 109 obtains the object velocity through communication with employed velocity sensing elements. In a particular embodiment, processor 109 obtains the velocity from communications with the camera vision sensing system comprising cameras 113 and 114. In another embodiment, processor 109 is programmed to obtain the velocity through communication with instrumentation comprising a test vehicle moving over planar surface P. Processor 109 treats the object velocity obtained as representative of a velocity at a time $t_i$. For example, when processor receives an object location $L_1$ corresponding to a time $t_1$, and additionally obtains an object velocity corresponding to the object location $L_1$, it treats the corresponding object velocity as representative of the directional velocity of the object at the time $t_1$ with the object generally situated at location $L_1$.

Processor 109 is further programmed to compute a desired acceleration vector, where the desired acceleration vector is a function of at least the first location 102, the object location at a time $t_i$ such as $L_1$ at the time $t_1$, and the corresponding object velocity. In typical embodiments, processor 109 is further programmed to obtain other parameters $\mu_r$, with these parameters being used to modify the acceleration to be applied. Generally, the function defining the desired acceleration vector may be expressed as $a_R=f(t,x_R,v_R,\mu_r)$, where t is the time associated with the object location received, $x_R$ is the relative spatial relationship as represented by the object location received, $v_R$ is the object velocity obtained, $\mu_r$ denote other relevant fixed, or time-varying parameters at time t, and $a_R$ is the desired acceleration vector. Typically $x_R$, $v_R$ and $\mu_t$ are expressed and utilized as vector quantities. The desired acceleration $a_R$ may be determined using any appropriate expression, provided the expression is a function of t, $x_R$, $v_R$ and $\mu_t$. In a typical embodiment, the function models inertial or non-inertial accelerations describing the motion of target and chaser spacecraft during proximity maneuvers. In other embodiments the function models inertial or non-inertial accelerations of a spacecraft relative to an object considered stationary. In most cases, appropriate scaling terms necessary to accurately reduce an expected scenario to the dimension of the planar surface P. In a particular embodiment, the function is a linearized equation of relative motion with variables expressed in an LVLH frame. In another embodiment, the linearized equation of relative motion describes relative motion between two spacecraft orbiting a third body. In some embodiments, the function comprises the orbital rate of a target spacecraft.

Having determined the desired acceleration vector $a_R$, processor 109 is programmed to calculate a desired planar surface orientation in which a vector projection of the quantified local gravity vector onto planar surface P mimics the desired acceleration vector $a_R$. Processor 109 calculates the desired planar surface orientation by determining an orientation where, when the planar surface is in the desired planar surface orientation, the quantified local gravity vector projected onto the axis $x_p$ generates an $a_{x1}$ and the quantified local gravity vector projected onto the axis $y_p$ generates an $a_{y1}$, and the desired acceleration vector projected onto the axis $x_p$ generates an $a_{x2}$ and the desired acceleration vector projected onto the axis $y_p$ generates an $a_{y2}$, and $0.9 \leq (a_{x1}/a_{x2}) \leq 1.1$ and $0.9 \leq (a_{y1}/a_{y2}) \leq 1.1$. In some embodiments, $0.95 \leq (a_{x1}/a_{x2}) \leq 1.05$ and $0.95 \leq (a_{y1}/a_{y2}) \leq 1.05$, and in other embodiments, $0.99 \leq (a_{x1}/a_{x2}) \leq 1.01$ and $0.99 \leq (a_{y1}/a_{y2}) \leq 1.01$. Stated equivalently, the desired planar surface orientation is an orientation of planar surface P where $a_{x1}$ divided by $a_{x2}$ is greater than or equal to 0.9 and less than or equal to 1.1, in some embodiments greater than or equal to 0.95 and less than or equal to 1.05, and in other embodiments greater than or equal to 0.99 and less than or equal to 1.01, and where $a_{y1}$ divided by $a_{y2}$ is greater than or equal to 0.9 and less than or equal to 1.1, in some embodiments greater than or equal to 0.95 and less than or equal to 1.05, and in other embodiments greater than or equal to 0.99 and less than or equal to 1.01.

As used here, the "desired planar surface orientation" means an orientation of a coordinate system comprising the $x_P$ and $y_P$ of planar surface P with respect to a coordinate system comprising an axis $x_o$, an axis $y_o$, and an axis $z_o$, where the axis $x_o$, the axis $y_o$, and the axis $z_o$ intersect at an origin O comprising planar table 101, and where the axis $z_0$ is parallel to the quantified local gravity vector, the axis $x_0$ is perpendicular to the axis $y_0$, and the axis $y_0$ is perpendicular to both the axis $z_0$ and the axis $x_0$. Processor 109 may calculate this desired planar surface orientation using any appropriate methodology known in the art, provided that the orientation establishes a geometry where at least $0.9 \leq (a_{x1}/a_{x2}) \leq 1.1$ and $0.9 \leq (a_{y1}/a_{y2}) \leq 1.1$. An appropriate $x_o$-$y_o$-$z_o$ coordinate system is illustrated at FIG. 1. Further, "parallel" means that a first direction vector is parallel to a first line and a second direction vector is parallel to a second line, and the angle between the first direction vector and the second direction vector is less than 5 degrees, preferably less than 2 degrees, and more preferably less than 1 degree. Similarly, when a vector is parallel to a planar surface this means that the vector is parallel to a line comprising planar surface.

Similarly, "perpendicular" means that the angle between the first direction vector and the second direction vector is at least 85 degrees, preferably at least 88 degrees, and more preferably at least 89 degrees.

Figure 4:
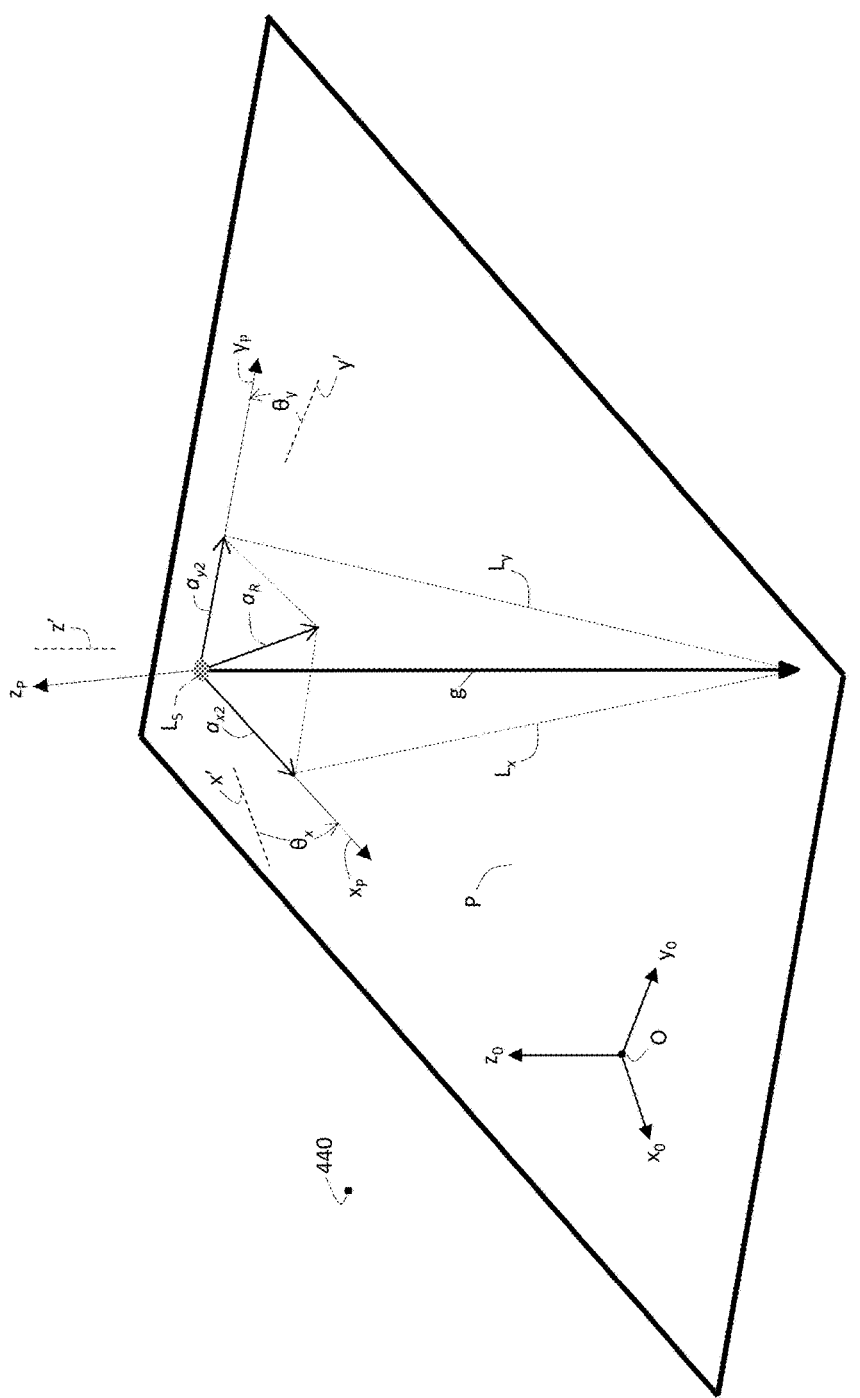
FIG. 4 illustrates a particular orientation of a planar surface.

As an example of an appropriate orientation, FIG. 4 illustrates a planar surface P of a planar test bed as disclosed with the planar surface P comprising the $x_P$ and $y_P$ axis as previously described. For illustrative purposes, a $z_P$ axis perpendicular to $x_P$ and $y_P$ is also included. Additionally illustrated is a location $L_5$ on planar surface P, with local gravity vector g extending through $L_5$. Although not illustrated, the quantified local gravity vector in this scenario is substantially equal to the local gravity vector g shown. Also shown is origin O, where origin O is a point comprising the planar test bed. An axis $y_0$, axis $x_o$, and axis $z_o$ intersect at the axes origin O, with $z_0$ parallel to the local gravity vector g, the $x_0$ perpendicular to $z_0$, and $y_0$ perpendicular to both $z_0$ and $x_0$. At FIG. 4, planar surface P has an orientation defining an angle $\theta_X$ between $x_P$ and $x_0$ and an angle $\theta_y$ between $y_P$ and $y_0$. Lines x', y', and z' are included for reference and are parallel to $x_0$, $y_0$, and $z_0$ respectively. A desired acceleration $a_R$ to be mimicked at location $L_5$ is additionally illustrated, where $a_R$ is co-planar with $x_P$ and $y_P$ and intended to act parallel to planar surface P. The vector projection of the desired acceleration $a_R$ onto $x_P$ is illustrated as $a_{x2}$ and the vector projection of the desired acceleration $a_R$ onto $y_P$ is illustrated as $a_{y2}$.

In the orientation depicted at FIG. 4, the vector projection of the local gravity vector g onto $x_P$ and $y_P$ is indicated by projection lines $L_X$ and $L_Y$ respectively. $L_X$ projects a component of g onto $x_P$ equal to an $a_{x1}$ (not shown for clarity) and $L_Y$ projects a component of g onto $y_P$ equal to an $a_{y1}$ (not shown for clarity). In this orientation and with the resulting projection of local gravity vector g, $0.9 \leq (a_{x1}/a_{x2}) \leq 1.1$ and $0.9 \leq (a_{y1}/a_{y2}) \leq 1.1$. In some embodiments $0.95 \leq (a_{x1}/a_{x2}) \leq 1.05$ and $0.95 \leq (a_{y1}/a_{y2}) \leq 1.05$ and in other embodiments $0.99 \leq (a_{x1}/a_{x2}) \leq 1.01$ and $0.99 \leq (a_{y1}/a_{y2}) \leq 1.01$. Additionally, it is understood that specific use of the angles $\theta_x$ and $\theta_y$ at FIG. 4 is exemplary only, and that processor 109 may determine and define the necessary orientation in any manner. For example, processor 109 might track and evaluate various orientations with reference to rotations about $x_o$ and $y_o$ and translation parallel to $z_o$ relative to some fixed point in space such as 440 using rotation matrices, Euler rotations, unit quaternions, and other means as known in the art.

Having calculated the desired planar surface orientation, processor 109 is programmed to issue commands to the one or more mechanical couplings and direct mechanical translations sufficient to establish planar surface P in the desired planar surface orientation. In this manner, processor 109 directs an orientation of planar surface P such that the local gravity vector g projected onto planar surface P acts to mimic the desired acceleration vector $a_R$ on planar surface P.

Test bed 100 operates cyclically to generate the time-varying gravity-induced acceleration by receiving a subsequent object location at a time $t_i$, for example $L_2$ at FIG. 1, and obtaining another object velocity, computing another desired acceleration vector, and establishing planar surface P is an updated orientation, where the updated orientation mimics the new desired acceleration vector, for example at $L_2$. In repeating type fashion, the test bed continues this process so that, for example, a test object traveling over planar surface P and observed at positions $L_1$, $L_2$, $L_3$, and $L_4$ will experience the relative accelerations that would be expected between the body represented by the test vehicle and the body represented by first location 102.

The mechanical couplings as discussed are generally slidably translatable, rotably translatable, or both, such that a mechanical translation of the one or more mechanical couplings alters a position vector between some specific, fixed point comprising the planar table and some specific, fixed point comprising the supporting leg. In embodiments where the planar test bed 100 comprises the origin O, the axis $x_O$, the axis $y_O$, and the axis $z_O$, when the axis $z_O$ is parallel to the quantified local gravity vector and the planar surface P is perpendicular to the axis $z_O$, the rotatable, slidable or other mechanical translation of the one or more mechanical couplings provides three degrees of freedom to planar table 100, with the first degree of freedom a rotation around the axis $x_O$, the second degree of freedom a rotation around the axis $y_O$, and the third degree of freedom a translation parallel to the axis $z_O$. Such mechanical couplings are known in the art and may be one of or a combination of mechanical couplings generally referred to as leveling wedges, leveling mounts, ball-and-socket joints, hinge joints, slider joints, universal joints, piston joints, and others. Typically the one or more mechanical joints comprise a motorized element in data communication and receiving commands from processor 109, and the motorized element generates motive force acting on and repositioning the mechanical joint in order to provide the desired orientation of planar surface P. In some embodiments, the motorized elements may communicate back to processor 109 in order to report a current mechanical posture of the mechanical coupling.

In some embodiments, planar table 101 further comprises one or more inclinometers in data communication with processor 109 and providing indications to processor 109 describing a current orientation of planar surface P. For example, in one embodiment, planar table 101 comprises inclinometers 118 and 119 where inclinometer 118 has a measurement axis parallel to axis $x_p$ of planar surface P and provides an inclination relative to axis $x_O$, and inclinometer 119 has a measurement axis parallel to axis $y_p$ of planar surface P and provides inclination relative to axis $y_O$. Such inclinometers are known in the art and generally determine inclinations using a local gravity vector such as g. As is understood, a single biaxial inclinometer may also be employed. In an embodiment, planar table 101 comprises one or more inclinometers in data communication with processor 109, and processor 109 is further programmed to receive a first inclination and a second inclination, treat the first inclination and second inclination as indicative of the current orientation of the axes $x_p$ and $y_p$ relative to at least the axis $x_O$ and the axis $y_O$, and determine a current planar surface orientation of planar surface P utilizing the first inclination and the second inclination.

In other embodiments, planar test bed 100 comprises one or more and typically a plurality of laser distance meters in data communication with processor 109 and providing distance measures to processor 109 in order to describe a current orientation of planar surface P. For example, at FIG. 1, planar table 101 comprises laser distance meters 120, 121, and 122 at three positions on planar table 101 with each having a measurement axis sufficiently aligned to determine a distance parallel to the axis $z_O$ at each location. In an embodiment, planar table 101 comprises the plurality of laser distance meters in data communication with processor 109, and processor 109 is further programmed to receive one or more distances and treat the one or more distances as indicative of a distance at a fixed location on planar table 101 and parallel to the quantified local gravity vector, and determine a current planar surface orientation of planar surface P utilizing the one or more distances. The current planar surface orientations described here may be used for a variety of purposes, including serving as feedback to processor 109 while enroute to a new, updated orientation.

In certain embodiments, processor 109 obtains an object position via communication with a camera vision sensing system such as that comprising camera 113, camera 114, and image processor 115. Image processor 115 may be a processor wholly distinct from processor 109 and in data communication with processor 109 via 123 as illustrated, or image processor 115 may be a set of instructions residing within processor 109. In these embodiments, cameras 113 and 114 are oriented such that the field-of-view (FOV) of each camera includes at least some portion of planar surface P. In other embodiments, processor 109 or image processor 115 obtains an object velocity using two or more images received from one or more of the cameras based on a displacement depicted and an elapsed time.

Figure 5:
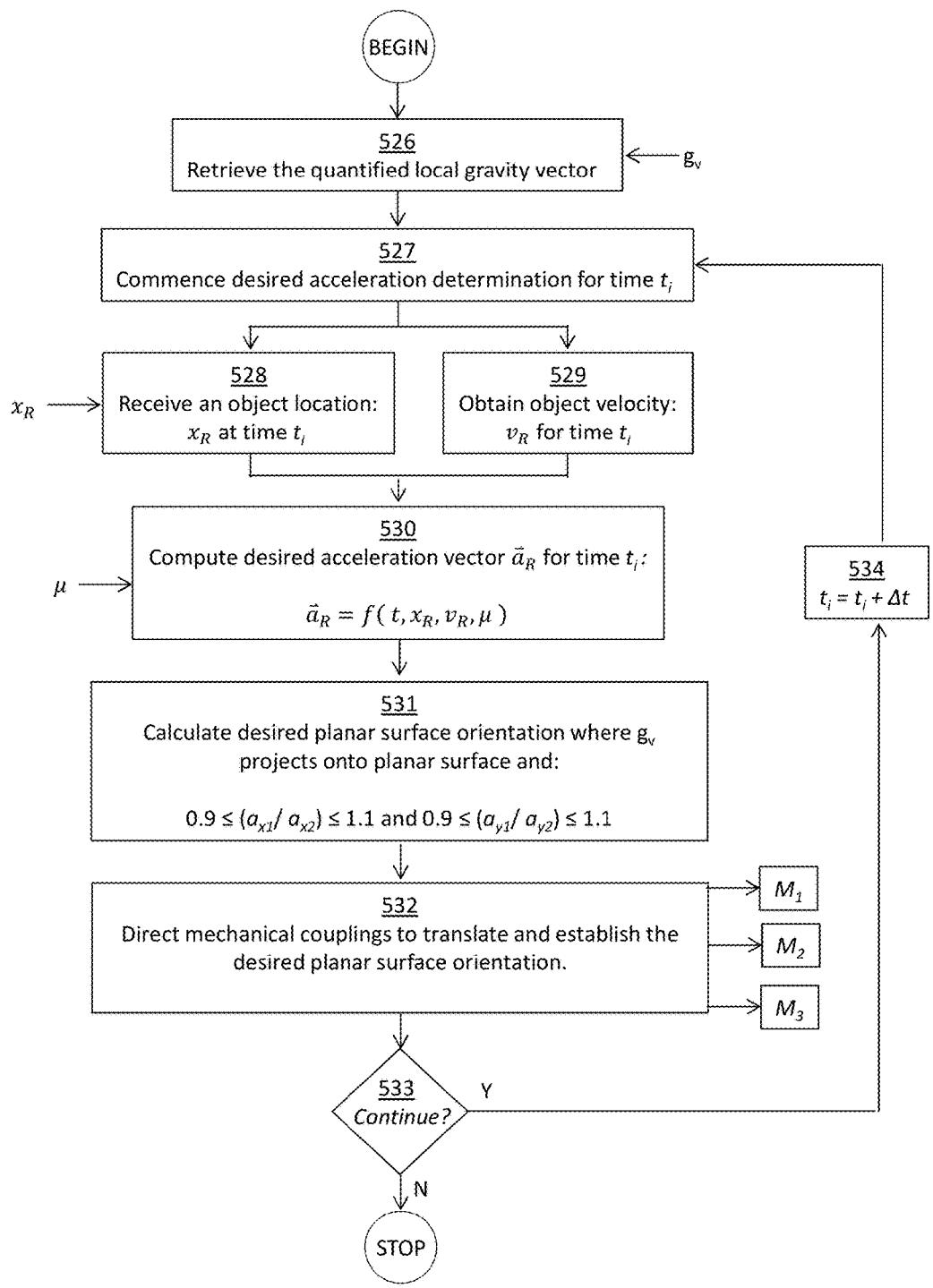
FIG. 5 illustrates an embodiment of a method performed by a planar test bed system.

The cyclic nature of the operations of processor 109 is depicted generally at FIG. 5. At FIG. 5, operations commence at BEGIN. At 526, the processor retrieves the quantified local gravity vector $g_v$ through an appropriate means, such as retrieval from an embedded memory device, receipt through a manual input, communication with an instrument such as an accelerometer, or other means. At 527, the processor commences determination of a desired acceleration for a time $t_i$. At 528, the processor receives an object location $x_R$ at the time $t_i$ and treats the object location $x_R$ as representative of a location on planar surface P. As discussed, processor 109 may retrieve the object location from any source. In an embodiment, a camera vision sensing system provides the object location $x_R$. At 529, the processor obtains an object velocity $v_R$ and treats the object velocity as a directional velocity of the object location received, relative to first location 102 of planar surface P. Processor 109 may obtain the object velocity from any source, for example, from the camera vision sensing system or through communication with on-board sensors comprising a test vehicle.

At 530, processor 109 computes a desired acceleration $a_R$ for the time $t_i$ using a function comprising time t, the object location $x_R$ retrieved, the object velocity $v_R$ obtained, and typically the required relevant orbital, environmental, and scaling parameters $\mu_r$. In a typical embodiment, the desired acceleration is determined with a function $a_R = f(t, x_R, v_R, \mu_r)$. When applicable, the processor may receive the required parameters $\mu_r$ from any source. Some of the parameters $\mu_r$ utilized in the function results from communications with a test vehicle operating on planar surface P.

At 531, processor 109 calculates the desired planar surface orientation to reproduce the desired acceleration $a_R$ on planar surface P, by determining an orientation where a vector projection of the quantified local gravity vector $g_v$ onto a plane comprising the $x_p$ and $y_p$ axes of the planar surface P sufficiently mimics the desired acceleration $a_R$. The appropriate orientation is an orientation where the quantified local gravity vector $g_v$ projected onto the axis $x_p$ generates an acceleration $a_{x1}$ and the desired acceleration vector projected onto the axis $x_p$ generates an $a_{x2}$, with $0.9 \leq (a_{x1}/a_{x2}) \leq 1.1$, and also where the quantified local gravity vector projected onto the axis $y_p$ generates an $a_{y1}$ and the desired acceleration vector projected onto the axis $y_p$ generates an $a_{y2}$, with $0.9 \leq (a_{y1}/a_{y2}) \leq 1.1$.

At 532, the processor directs the one or more mechanical couplings such as $M_1$, $M_2$, and $M_3$ to mechanically translate and establish planar surface P in the desired planar surface orientation.

At 533, the processor determines if continued operations are required, and if so, increments $t_i$ at 534 to establish a new $t_i$, and repeats at least steps 527-533. At 533, processor 109 may use any indication to determine continuation, such as a maximum $t_i$, a particular relative position $x_R$ received, a manual input, or any other criteria by which continuation of the process may be affirmed. Further, it is understood that the duration of the time interval Δt at FIG. 5 may vary from cycle to cycle and need not be constant.

In a particular embodiment, the rigid flat table (e.g. a granite monolith) is mounted on top of three height-adjustable pedestals. By changing the height of the pedestals the orientation of the table's flat surface with respect to the local gravity is adjusted. When the table deviates from its leveled orientation, a gravitational acceleration is imparted to the test vehicles. The actuators that regulate the height of the pedestals are connected to a central controller (i.e. a computer) that coordinates their action so that the desired table orientation (i.e. acceleration) is obtained. Two high precision inclinometers (or one two-axis inclinometer) measure the orientation of the operating surface with respect to the local gravity and provide feedback to the controller. By measuring the height of three points of the flat table the orientation of the table can also be determined. Three high precision laser distance meters can be used for this task.

Assume, without loss of generality, that the three pedestals to surface contact point positions are known with respect to a fixed reference frame with a Cartesian Coordinate System having the z-axis aligned with the local gravity. Let the vector from the origin of this reference frame to the three supports be denoted by $p_i$ with i=1, 2, 3. A vector n that is normal to the table's surface can be easily computed as follows.

$$n=(p_3-p_1)\times(p_2-p_1).$$

Define, without a loss in generality, a reference frame that is attached to the test bed flat table with its $z^0$-axis perpendicular to the surface (i.e. along n). If $\hat{n}$ denotes the normalized n vector and g=9.81 m/s² denotes local surface gravity magnitude, then the acceleration imparted on a test vehicle floating on the flat table frame can be determined as follows.

$$a_x'=g\hat{n}_x$$

$$a_y'=g\hat{n}_y$$

The orientation of the flat table can be time-varying in order to impart a time-varying acceleration $a_R(t)$. In general, a model f can be used to determine the required acceleration $a_R$ given the current time t, as well as the position $x_R$ and velocity $v_R$ based on the test vehicle. Other time-varying parameters $\mu_t(t)$ may also be used to drive the f model.

$$a_R=f(t,x_R,v_R,\mu_t)$$

As the f model may depend on the state of the test vehicle ($x_R$ and $v_R$) this state must be known by the controller. Different methods can be used to determine the state of the vehicles (for example a motion capture system or state estimation provided by the test vehicle(s)). A wireless link between the test vehicle and the controller can be used by the vehicle to transmit some of the $\mu_t$ parameters that may be needed by the f model. The controller can also inform the test vehicle of the flat table orientation and the resulting acceleration $a_R$.

Figure 6:
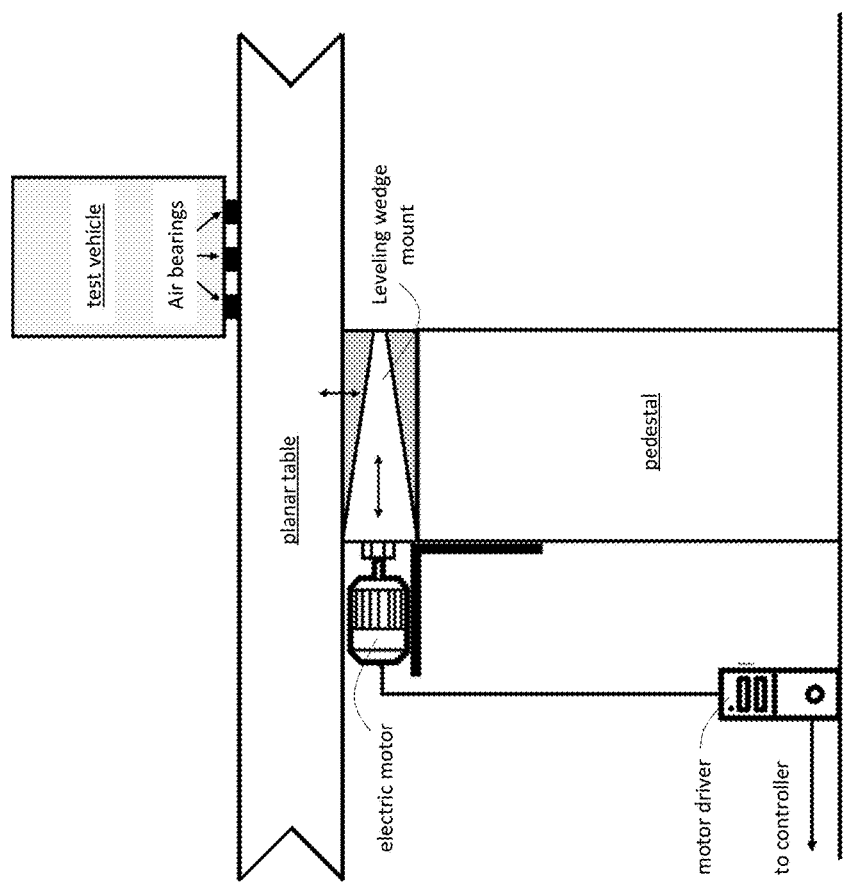
FIG. 6 illustrates a specific embodiment of a planar test bed.

A particularly suitable disposition to actuate the height-adjustable pedestals is a leveling wedge actuated by an electric motor. FIG. 6 shows a notional representation of this particular embodiment of a height-adjustable pedestal. It is customary to mount granite monoliths for planar air bearings on top of three pedestals. Leveling wedges are then used to manually adjust the height of pedestals in order to ensure the horizontality of the flat table once installed (i.e. compensating for uneven foundations). At FIG. 6, the leveling wedges are motorized with an electric motor. The leveling wedges are then actuated to achieve the required flat table orientation. A setting screw is used to regulate the leveling wedge's height. An electric motor coupled to a high reduction gear can be used to actuate this screw and automate the height-adjustment procedure. FIG. 6 illustrates the scenario depicting a test vehicle and planar table, with a leveling wedge mount driven by an electric motor, and a motor driver in data communication with a controller.

Figure 7:
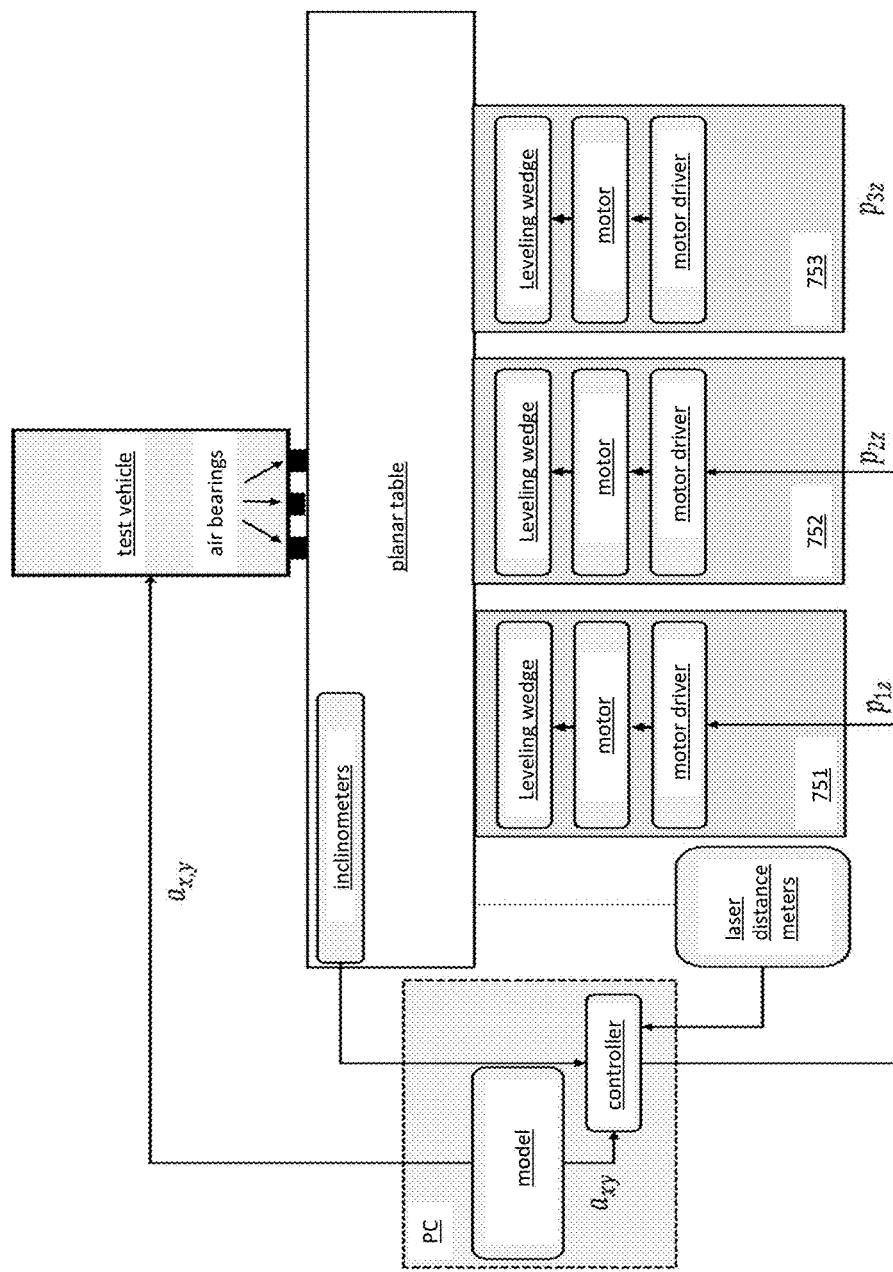
FIG. 7 illustrates another embodiment of a planar test bed.

The central controller is used to coordinate the electric motors that actuate the wedge leveling mounts. Although an open-loop scheme could be used to control the three motors, two high precision inclinometers or three laser distance meters can be used to provide feedback to the controller. An overview of all the elements in an embodiment of the system is shown in FIG. 7, illustrating a test vehicle with air bearings atop a planar table, with the planar table comprising one or more inclinometers. Supporting legs 751, 752, and 753 are each in mechanical communication with a leveling wedge as illustrated, with each leveling wedge driven by a motor and motor driver. Each motor driver is in data communication with a controller comprising a digital processor (PC). The PC further comprises a model for the computation of a relative acceleration $a_{x,y}$. A laser distance meter is also illustrated in data communication with the controller.

Figure 8:
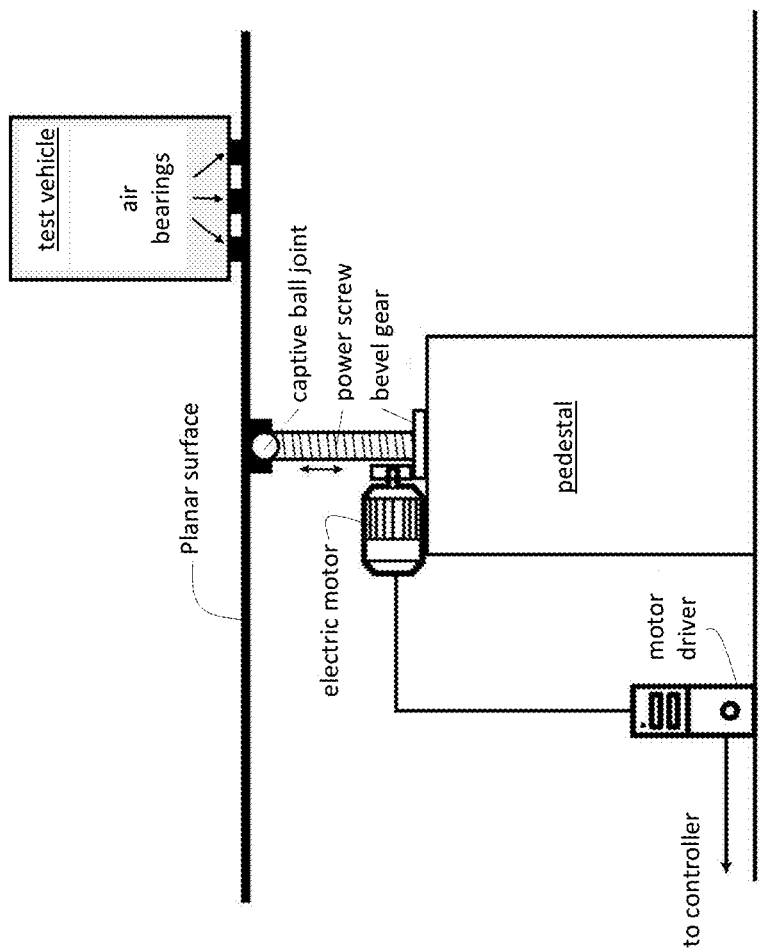
FIG. 8 illustrates an additional embodiment of a planar test bed.

An alternative realization uses a linear motor in conjunction with one or more supporting legs as shown in FIG. 8. FIG. 8 illustrates a planar table comprising a planar surface. A mechanical coupling comprising a captive ball joint, power screw, and bevel gear is driven by an electric motor and in mechanical communication with the planar table and a pedestal. A motor driver is in communication with the electric motor and in data communication with a controller.

Additional relevant information on the operations of a particular embodiment of the planar test bed is presented below.

Description of a Specific Embodiment

The invention disclosed provides a floating spacecraft simulator that comprises a flat table that can dynamically change its orientation with respect to the local gravity and thus impart a time-varying acceleration to the test vehicles. This capability can be used to impart arbitrary time-varying accelerations to the test vehicles without using their actuators, thus greatly extending the applicability of planar air bearing test beds.

The non-inertial accelerations that appear when studying the motion of spacecraft during proximity maneuvers provide a paradigmatic example of the utility of this concept. By tilting the flat table these non-inertial accelerations can be imparted to the test vehicles. As these accelerations are dependent on the relative state between the spacecraft and the origin of the non-inertial frame (e.g. see the Hill-Clohessy-Wiltshire equations) the tilt of the flat table must constantly change to impart the correct acceleration (magnitude and direction).

A spacecraft orbiting a small and irregular planetary body is another example where a spacecraft would be subject to a time-varying residual acceleration that can be recreated by continuously tilting the flat table. In some other scenarios, other orbital perturbations cannot be neglected either (e.g.

aerodynamic forces or solar radiation pressure perturbations). By tilting the flat table, the effects of these time-varying perturbations can also be recreated. By tilting the flat table all the vehicles floating on its top experience the same acceleration.

Unfortunately air-bearing test beds have operating tables limited dimensions and in most instances the considered problems span much larger distances. To accommodate these test scenarios, generic scaling of the system dynamics allows to replication on small operating surfaces.

Scaling of the Problem Dynamics:

The Buckingham's Pi theorem is utilized to derive the scaling laws. This theorem states that for a system described by p variables which involve q independent dimensional units, there exists p-q dimensionless 7L parameters that must remain invariant during the scaling process in order to guarantee dynamic similitude. The following vectorial relationships can be used to fully describe the test vehicle's translational dynamics, with F denoting the resultant force acting on the vehicle, m its mass, t time, and a, v, and r denoting the vehicle's acceleration, velocity and position respectively $$F = ma \tag{1a}$$

$$a = \frac{dv}{dt} \tag{1b}$$

$$v = \frac{dr}{dt} \tag{1c}$$

As the test vehicle is moving on a plane, Eq. 2 can be decomposed into two systems of scalar equations.

$$F_i = ma_i \quad i = 1, 2 \tag{2a}$$

$$a_i = \frac{dv_i}{dt} \quad i = 1, 2 \tag{2b}$$

$$v_i = \frac{dr_i}{dt} \quad i = 1, 2 \tag{2c}$$

Focusing in any of these two systems it is immediate to observe that it contains p=6 relevant variables ($F_i$, m, $a_i$, $v_i$, $r_i$, t) which involve q=3 independent dimensional units (mass M, length L, and time T). According to Buckingham's Pi theorem, there are p–q=3 independent π dimensionless parameters.

A systematic method to derive these dimensionless parameters is to select q "core" variables from the p set to represent the q independent dimensional units. For example, we can select m for the mass M, $x_i$ for distance L, and t for time T. The p–q π dimensionless parameters can be found by finding the combination of the "core" variables that when multiplied with each of the remaining p variables produces a dimensionless parameter. This problem can be formulated as finding the μ coefficients that make the following π parameters dimensionless.

$$\pi_1 = t^{\mu 1,1} r_i^{\mu 2,1} m^{\mu 3,1} v_i \tag{3a}$$

$$\pi_2 = t^{\mu 1,2} r_i^{\mu 2,2} m^{\mu 3,2} a_i \tag{3b}$$

$$\pi_3 = t^{\mu 1,3} r_i^{\mu 2,3} m^{\mu 3,3} F_i \tag{3c}$$

It is then straightforward to find the p coefficients and thus the π dimensionless parameters that must be kept constant in order to preserve the dynamic similitude are the following.

$$\pi_1 = \frac{tv_i}{r_i} \tag{4a}$$

$$\pi_2 = \frac{t^2 a_i}{r_i} \tag{4b}$$

$$\pi_3 = \frac{t^2 F_i}{m r_i} \tag{4c}$$

If a variable on the original problem is denoted by Q its scaled version will be denoted by $Q^0$. We can then define its scaling factor as follows.

$$\lambda_Q = \frac{Q}{Q'} \tag{5}$$

By imposing the invariance of the Eq. 4 dimensionless parameters the following scaling laws between the different scaling factors can be derived.

$$\lambda_{ri} = \lambda_t \lambda_{vi} \tag{6a}$$

$$\lambda_{ri} = \lambda_{2t} \lambda_{ai} \tag{6b}$$

$$\lambda_m \lambda_{ri} = \lambda_{2t} \lambda_{Fi} \tag{6c}$$

For a one-dimensional case, there are 6 scaling parameters $\lambda_Q$ to set and only 3 linearly independent nonlinear equations.

These scaling laws can be utilized to greatly expand the applicability of the test bed. Assume emulation of the Apollo Moon landings on the POSEIDYN test bed. See Zappulla II, R., Virgili-Llop, J., Zagaris, C., Park, H., and Romano, M., "Dynamic Air-Bearing Hardware-in-the-Loop Testbed to Experimentally Evaluate Autonomous Spacecraft Proximity Maneuvers," *Journal of Spacecraft and Rockets*, in press, 2017. The mass of the Lunar Module was approximately 15000 kg and it maximum thrust of 45 kN. The POSEIDYN test vehicle's mass is 10 kg and their maximum thrust is 0.3 N. Therefore, select $\lambda_m$=10 and $\lambda_F$=500/3. To recreate the last 300 m of landing phase in the 4 m granite monolith then $\lambda_x$=10. It thus follows that $\lambda_t$=0.87, $\lambda_a$=100, and $\lambda_v$=86. The Moon's surface gravity of g=1.625 m/s² will have to be simulated in the test bed as a g'=0.01625 m/s², which corresponds to tilting the table 0.095'. As the scaled Moon acceleration g' is several orders of magnitude larger than the 19 μg of residual acceleration on the POSEIDYN test bed (equivalent to a surface tilt of 0.0011'), the scaled Moon gravity could be recreated without being significantly impacted by the test bed residual acceleration. Another interesting point to note about this example is that the maneuver time on the air bearing test bed will only be 13% slower than the real landing maneuver. By forcing the flight computer to be idle for 13% of the time, the guidance navigation and control software can be tested with equivalent real-time conditions.

An upcoming mission might attempt to perform a touch-and go maneuver on the near-Earth asteroid Bennu. With the appropriate scaling, this maneuver can also be practiced on the POSEIDYN test bed. The spacecraft mass is approximately 1500 kg and uses two 0.08 N thrusters. The final touch-and-go maneuver occurs from an altitude of 125 m. The resulting scaling is $\lambda_m$=150, $\lambda_F$=0.53, and $\lambda_x$=31.2, $\lambda_t$=93.8, $\lambda_a$=0.0036, and $\lambda_v$=0.33. The surface gravity of Bennu is $g_B \approx 2.1 \times 10^{-5}$ m/s², which is well below the residual acceleration of the POSEIDYN test bed. When the scaling is factored in then $g_B^0 \approx 0.0059$ m/s² (corresponding with a tilt of 0.034°), which is approximately 30 times larger than the test bed residual acceleration. In this case the maneuver in the test bed occurs much faster than the real maneuver ($\lambda_t$ times faster) and thus if the guidance and control software can meet the more stringent time requirements in the test bed it will have time to spare once in space.

This analysis can be easily extended to the two-dimensional case. In that case there are p=9 relevant variables ($F_{1,2}, m, a_{1,2}, v_{1,2}, r_{1,2}, t$) and still q=3 independent dimensional units. Therefore p−q=6 independent 7r dimensionless parameters can be defined.

$$\pi_1 = \frac{tv_1}{r_1} \quad \pi_4 = \frac{tv_2}{r_2} \tag{7a}$$

$$\pi_2 = \frac{t^2 a_1}{r_1} \quad \pi_5 = \frac{t^2 a_2}{r_2} \tag{7b}$$

$$\pi_3 = \frac{t^2 F_1}{mr_1} \quad \pi_6 = \frac{t^2 F_i}{mr_2} \tag{7c}$$

The scaling factor relationships also double when the additional dimension is introduced.

$$\lambda_{r1} = \lambda_t \lambda_{v1} \quad \lambda_{r2} = \lambda_t \lambda_{v2} \tag{8a}$$

$$\lambda_{r1} = \lambda_{2t} \lambda_{a1} \quad \lambda_{r2} = \lambda_{2t} \lambda_{a2} \tag{8b}$$

$$\lambda_m \lambda_{r1} = \lambda_{2t} \lambda_{F1} \quad \lambda_m \lambda_{r2} = \lambda_{2t} \lambda_{F2} \tag{8c}$$

These scaling relationships show that the scaling in the two different dimensions can be different. In the case of the planetary landings this can be used to scale the along track landing dimension, which may not be of the same magnitude that the maneuver's vertical dimension.

The scaling can also be used to recreate the relative orbital dynamics. Assume a standard case of a spacecraft operating in close proximity of a Resident Space Object (RSO) that is in a circular orbit around the Earth. The relative motion of the spacecraft in relation to the RSO can be approximated, in the local-vertical local-horizontal frame, by the well known Hill-Clohessy-Wiltshire equations shown in Eq. 9.

$$a_x = -2nv_y + \frac{F_x}{m} \tag{9a}$$

$$a_y = 3n^2 r_y + 2nv_x + \frac{F_y}{m} \tag{9b}$$

$$a_z = -n^2 r_z + \frac{F_z}{m} \tag{9c}$$

In Eq. 9, the x direction is along the RSO orbital velocity (V-bar), y points towards the center of the Earth (R-bar) and z is perpendicular to the orbit plane. The mean motion of the orbit is denoted by n and can be computed by Eq. 10, where µ is the Earth's and a denotes the orbit's semi-major axis. It is worth pointing out at this point that the relationship between the orbit's period P and the mean motion can be expressed as in Eq. 11 and then it is straightforward to derive the relationship between $\lambda_n$ and $\lambda_t$.

$$n = \sqrt{\frac{\mu}{a^3}} \tag{10}$$

-continued $$P = \frac{2\pi}{n} \tag{11}$$

$$\lambda_n = \frac{1}{\lambda_t} \tag{12}$$

In this approximation the relative motion occurring out of the orbit's plane is independent from the in-plane motion and can be then controlled independently. For a planar test bed it may be more interesting to simulate the in-plane relative orbital dynamics. By appropriately scaling the problem and by dynamically tilting the test bed's operating surface the relative orbital dynamics effects can be emulated.

To illustrate the procedure on how to determine the scale factors and the operating surface tilt time history an example is here provided. Assume that the spacecraft is simply in a relative periodic orbit around the RSO. If there are no external forces on the spacecraft $F_{x,y,z}=0$ the in-plane Clohessy-Wiltshire equations have the following closed form solution.

$$r_x(t) = r_{x0} + 6(\sin nt - nt)r_{y0} - \frac{2}{n}(1 - \cos nt)v_{y0} + \frac{4\sin nt - 3nt}{n}v_{x0} \tag{13a}$$

$$r_y(t) = (4 - 3\cos nt)r_{y0} + \frac{\sin nt}{n}v_{y0} + \frac{2}{n}(1 - \cos nt)v_{x0} \tag{13b}$$

By selecting the Eq. 14 initial conditions, the periodic orbit described in Eq. 15 is obtained.

$$r_x(0) = \frac{2v_0}{n} \quad v_x(0) = 0 \tag{14a}$$

$$r_y(0) = 0 \quad v_y(0) = 0 \tag{14b}$$

$$r_x(t) = \frac{2\cos nt}{n} v_0 \tag{15a}$$

$$r_y(t) = \frac{\sin nt}{n} v_0 \tag{15b}$$

The velocities and accelerations can be computed as follows.

$$v_x(t) = -2v_0 \sin nt \quad a_x(t) = -2nv_0 \cos nt \tag{16a}$$

$$v_y(t) = v_0 \cos nt \quad a_y(t) = -nv_0 \sin nt \tag{16b}$$

Assume simulating a circumnavigation of the International Space Station (ISS), so let $x_0$=450 m so that the m is bigger than the ISS keep-out zone. As the POSEIDYN granite table is 4-by-4 meters let $\lambda_{rx}$=62.50 and $\lambda_{ry}$=31.25. The ISS orbital altitude is approximately 400 km which makes its period around 92 minutes. To limit the circumnavigation to around 4 minutes then $\lambda_t$=23.10. From these scaling factors it follows $\lambda_{ax}$=0.21 and $\lambda_{ay}$=0.11. In this circumnavigation case, the relative orbital dynamics acceleration ranges from 0 to max($a_x$)=2n$v_0$ and max($a_y$)=n$v_0$. When the $\lambda_{ax,y}$ scaling is applied these maximum accelerations correspond to a tilt angle of 0.016' (in either direction).

Another interesting aspect may be to compute which is the percentage of this relative orbit where the relative accelerations fall below a certain threshold (so that they cannot be accurately reproduced in the test bed).

$$a'_x \leq a \quad (17)$$

$$a'_y \leq a \quad (18)$$

Define that threshold as 2 times the POSEIDYN residual acceleration $a_{tres}$=38 μg. In this case study that would occur 17% of the orbit (around the vertex and co-vertex of the ellipse).

It is interesting to note that the scaled acceleration is independent of the size of the relative orbit. It only depends in the size of the test bed operating surface and the scaled orbit period (see Eq. 19).

$$a'_x = -\frac{2nv_0 \sin nt}{\lambda_{a_x}} = -n^2 r_{0x} \frac{\lambda_t^2}{\lambda_{r_x}} \sin nt = -r'_{0x} \left(\frac{2\pi}{P'}\right)^2 \sin n't' \quad (19)$$

This similitude equivalence far from being specific for a circumnavigation case is shared with the general relative orbital dynamics accelerations, making the scaling very simple and convenient. A maneuver performed in the test bed shares the dynamic simulated with the same maneuver regardless of the RSO orbiting altitude and relative distance.

$$i_x' = -2n'v_y' \quad (20a)$$

$$(a_y' = 3n'^2 e_y' + 2n'v_x') \quad (20a)$$

$$i_z' = -n'^2 r_z' \quad (20c)$$

These relative orbital dynamics accelerations are generated by tilting the operating surface. The remaining acceleration from the onboard thrusters can be scaled using Eq. 6c, and in this case the operating altitude and maneuver distance will have an effect on the scaling.

The FSS has a mass of 10 kg. Assume that we want to simulate the Cygnus spacecraft that approximately has a berthing mass of 5300 kg, then $\lambda_m$=530. That leaves $\lambda_{Fx}$=113.7 and $\lambda_{Fy}$=56.9. The FSS has a maximum thrust per axis of 0.3 N which when scaled would represent a maximum thrust of $F_x$=34 N and $F_y$=17 N which are smaller but similar to the Cygnus capabilities.

Although the Clohessy-Wiltshire equations are a simplification of the relative orbital dynamics they can be used to quickly derive the scaling factors. For a more generic case, use where $a_R$ as the relative orbital dynamics acceleration, $$\frac{F}{m}$$

to represent the acceleration induced by the control forces (i.e. by the thrusters) and $a_{others}$ to denote the acceleration by other perturbations (e.g. solar radiation pressure or drag).

$$a = a_R + \frac{F}{m} + a_{others}$$

Regardless of how the relative orbital dynamics $a_R$ and other perturbations. $a_{others}$ are computed, these accelerations are recreated by tilting the planar air bearing operating surface.

Thus provided here is planar test bed comprising a planar table having a planar surface for the simulation or relative accelerations between a first location on the planar surface and an object location. The planar test bed comprises one or more mechanical couplings with each in mechanically communication with the planar table a supporting leg, with the mechanical couplings mechanically translatable to provide three degrees of freedom to the planar table. A processor in data communication with the mechanical couplings and issues commands to the mechanical couplings to alter the spatial orientation of the planar table in a transient process, in order to allow a local gravity vector g to mimic an anticipated relative acceleration between two bodies in a simulated environment, typically using a function $a_R$=f(t,$x_R$, $v_R$,$\mu_t$). The planar test bed operates in a cyclic manner so that desired accelerations and planar orientations are updated as an object transits over the planar surface. In a particular embodiment, the system further comprises a camera vision sensing system providing at least positional data to the processor during the cyclic process.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A planar test bed for creating time-varying gravity-induced accelerations comprising:
   a planar table, the planar table comprising a planar surface and the planar surface comprising a first location, and where the planar surface comprises an axis $x_p$ and an axis $y_p$ where the axis $x_p$ is perpendicular to the axis $y_p$;
   one or more mechanical couplings, where each mechanical coupling is in mechanical communication with the planar table and a supporting leg, and where the each mechanical coupling is mechanically translatable, where a mechanical translation of the each mechanical coupling alters a position vector between a specific point on the planar table and a specific point on the supporting leg; and
   a processor in data communication with the one or more mechanical couplings where the processor is programmed to perform steps comprising:
      retrieving a quantified local gravity vector; and
      performing a cyclic operation to create the time-varying gravity-induced accelerations by:
         receiving an object location at a time $t_0$, where the object location at the time $t_0$ is a location on the planar surface;

obtaining an object velocity, where the object velocity is a relative velocity between the object location at the time $t_0$ and the first location comprising the planar surface;

computing a desired acceleration vector $a_R$, where the desired acceleration vector $a_R$ is a function of at least the first location comprising the planar surface, the object location at the time $t_0$, and the object velocity;

calculating a desired planar surface orientation comprising:

projecting the quantified local gravity vector onto the axis $x_p$ to generate an $a_{x1}$, projecting the quantified local gravity vector onto the axis $y_p$ to generate an $a_{y1}$, projecting the desired acceleration vector $a_R$ onto the axis $x_p$ to generate an $a_{x2}$, and projecting the desired acceleration vector $a_R$ onto the axis $y_p$ to generate an $a_{y2}$, and wherein $0.9 \le (a_{x1}/a_{x2}) \le 1.1$ and $0.9 \le (a_{y1}/a_{y2}) \le 1.1$;

mimicking the desired acceleration vector $a_R$ on the planar surface, by communicating with one or more mechanical couplings and directing the one or more mechanical couplings to mechanically translate and establish the planar surface in the desired planar surface orientation; and receiving a subsequent object location at a time $t_i$, where the time $t_i$ is later than the time $t_0$, and repeating the obtaining the object velocity step, the computing the desired acceleration vector $a_R$ step, the calculating the desired planar surface orientation step, and the mimicking the desired acceleration vector $a_R$ on the planar surface step using the subsequent object location at the time $t_j$ as the object location at the time $t_0$, thereby creating the time-varying gravity-induced acceleration.

2. The planar test bed of claim 1 where the planar surface comprises an axes origin, and where an axis $x_o$, and axis $y_o$, and an axis $z_o$ intersect at the axes origin, where the axis $x_0$ is perpendicular to the axis $y_0$ and the axis $z_0$ is perpendicular to the axis $y_0$ and the axis $x_0$, and where when the axis $z_0$ is parallel to the quantified local gravity vector and the planar surface is perpendicular to the axis $z_o$, the mechanical translation of the one or more mechanical couplings provides three degrees of freedom to the planar table, where the first degree of freedom is a rotation around the axis $x_0$, the second degree of freedom is a rotation around the axis $y_0$, and the third degree of freedom is a translation parallel to the axis $z_0$.

3. The planar test bed of claim 2 where the desired planar surface orientation calculated by the processor defines an angle $\theta_x$ between the axis $x_P$ and the axis $x_o$ and an angle $\theta_y$ between the axis $y_P$ and the axis $y_o$, and at least one of the angle $\theta_x$ and the angle $\theta_z$ is greater than zero.

4. The planar test bed of claim 1 where the processor is programmed to obtain the object velocity by performing steps comprising:

collecting a plurality of object locations where the plurality of object locations comprises the object location at the time $t_0$ and the subsequent object location at the time $t_i$; and calculating the object velocity using the plurality of object locations, the time $t_o$, and the time $t_i$.

5. The planar test bed of claim 4 further comprising a motion sensing system comprising a camera, where the camera has a field of view and where the planar table comprises at least some portion of the field of view, and where the camera is in data communication with the processor, and where the processor is further programmed to perform steps comprising:

receiving a plurality of images from the camera where the plurality of images comprises an image for the time $t_o$ and an image for the time $t_i$;

determining the object location at the time $t_0$ using at least the image for the time $t_o$ and determining the subsequent object location at the time $t_i$ using at least the image for the time $t_i$.

6. The planar test bed of claim 4 further comprising an object in data communication with the processor, where the processor is further programmed to receive the object location at the time $t_0$ and the subsequent object location at the time $t_i$ from the object.

7. The planar test bed of claim 1 where the planar table further comprises one or more inclinometers, where the one or more inclinometers have a first measurement axis parallel to the axis $x_p$ and a second measurement axis parallel to the axis $y_p$, and the one or more inclinometers in data communication with the processor, and where the processor is further programmed to receive a first inclination from the one or more inclinometers and a second inclination from the one or more inclinometers and determine a current planar surface orientation utilizing the first inclination and the second inclination.

8. The planar test bed of claim 1 where the planar table further comprises one or more distance meters in data communication with the processor, and where the processor is further programmed to receive a one or more distance measures from the one or more distance meters and determine a current planar surface orientation utilizing the one or more distance measures.

9. A system for creating time-varying gravity-induced acceleration on a planar surface, the system comprising:

a planar table, the planar table comprising a planar surface and the planar surface comprising a first location, and the planar surface comprising an axis $x_p$ and an axis $y_p$ where the axis $x_p$ is perpendicular to the axis $y_p$, and a local gravity vector acting on the planar table;

an object in contact with the planar surface and moving across the planar surface, and the object residing at an object location, where the object location is a location of the object on the planar surface relative to the first location comprising the planar surface;

one or more mechanical couplings where each mechanical coupling is in mechanical communication with the planar table and a supporting leg, and where the each mechanical coupling is mechanically translatable, where a mechanical translation of the each mechanical coupling alters a position vector between a specific point on the planar table and a specific point on the supporting leg;

a processor in data communication with the one or more mechanical couplings and performing steps comprising:

receiving the object location;

obtaining an object velocity, where the object velocity is a relative velocity between the object and the first location comprising the planar surface;

computing a desired acceleration vector $a_R$, where the desired acceleration vector $a_R$ is a function of at least the first location comprising the planar surface, the object location, and the object velocity;

calculating a desired orientation of the planar surface comprising:

projecting the local gravity vector onto the axis $x_p$ to generate an $a_{x1}$, projecting the local gravity vector onto the axis $y_p$ to generate an $a_{y1}$, projecting the desired acceleration vector $a_R$ onto the axis $x_p$ to generate an $a_{x2}$, and projecting the desired acceleration vector $a_R$ onto the axis $y_p$ to generate an $a_{y2}$, wherein $0.9 \leq (a_{x1}/a_{x2}) \leq 1.1$ and $0.9 \leq (a_{y1}/a_{y2}) \leq 1.1$;

communicating the desired orientation of the planar surface to one or more mechanical couplings, where each mechanical coupling is in mechanical communication with the planar table and a supporting leg, and where the each mechanical coupling is mechanically translatable, where a mechanical translation of the each mechanical coupling alters a position vector between a specific point on the planar table and a specific point on the supporting leg;

the one or more mechanical couplings mechanically translating, and the mechanical translations of the one or more mechanical couplings establishing the planar surface in the desired orientation of the planar surface; and the object transiting over the planar surface from the object location to a subsequent object location, where the subsequent object location is another location of the object on the planar surface relative to the first location comprising the planar surface, and the system repeating the receiving the object location step, the obtaining the object velocity step, the computing the desired acceleration vector $a_R$ step, the calculating the desired orientation of the planar surface step, the communicating the desired orientation of the planar surface to the one or more mechanical couplings step, and the one or more mechanical couplings mechanically translating step using the subsequent object location as the object location, thereby creating the time-varying gravity-induced acceleration.

10. The system of claim 9 where the planar table comprises an origin O, and where an axis $z_o$ is parallel to the local gravity vector and intersects the origin O, and where an axis $x_0$ is perpendicular to the axis $z_0$ and an axis $y_0$ is perpendicular to both the axis $z_0$ and the axis $x_0$, and where the desired orientation of the planar surface defines an angle $\theta_x$ between the axis $x_P$ and the axis $x_o$ and an angle $\theta_y$ between the axis $y_P$ and the axis $y_o$, and further comprising the one or more mechanical couplings mechanically translating and establishing the angle $\theta_x$ and the angle $\theta_y$.

11. The system of claim 10 further comprising:

a motion sensing system comprising a camera, where the camera has a field of view and where the object is within the field of view, and the camera communicating a plurality of images to the processor; and the processor receiving the plurality of images and determining the object location and the subsequent object location using the plurality of images.

12. The system of claim 11 further comprising the processor determining the object velocity using the plurality of images.

13. The system of claim 10 further comprising the object communicating the object location and the subsequent object location to the processor.

14. The system of claim 10 further comprising:

one or more inclinometers having a first measurement axis parallel to the axis $x_p$ and a second measurement axis parallel to the axis $y_p$, and the one or more inclinometers communicating a first inclination and a second inclination to the processor, where the first inclination describes an angle between the axis $x_P$ and the local gravity vector and the second inclination describes an angle between the axis $y_P$ and the local gravity vector; and the processor utilizing the first inclination and the second inclination to determine a current planar surface orientation.

15. The system of claim 10 further comprising:

one or more distance meters communicating one or more distances to the processor where the one or more distances are parallel to the local gravity vector; and the processor utilizing the one or more distances to determine a current planar surface orientation.

* * * * *